US009238983B2

(12) United States Patent
Zhang et al.

(10) Patent No.: US 9,238,983 B2
(45) Date of Patent: Jan. 19, 2016

(54) SECONDARY AIR INTRODUCTION SYSTEM

(75) Inventors: Xiaogang Zhang, Novi, MI (US);
Jianwen James Yi, Canton, MI (US);
Wen Dai, Canton, MI (US); Paul M. Laing, Canton, MI (US); John Hedges, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 443 days.

(21) Appl. No.: 13/605,895

(22) Filed: Sep. 6, 2012

(65) Prior Publication Data
US 2014/0060040 A1    Mar. 6, 2014

(51) Int. Cl.
*F02D 23/00* (2006.01)
*F01N 3/20* (2006.01)

(52) U.S. Cl.
CPC .............. *F01N 3/2066* (2013.01); *F01N 3/208* (2013.01); *F01N 2610/10* (2013.01); *F01N 2610/105* (2013.01); *F01N 2610/144* (2013.01); *F01N 2610/1433* (2013.01); *F01N 2610/1486* (2013.01); *Y02T 10/24* (2013.01)

(58) Field of Classification Search
CPC ....... Y10T 10/144; Y10T 10/26; Y10T 10/20; Y10T 10/22; F02B 37/18; F02B 37/16; F01N 3/2006; F01N 2270/00; F02D 41/0255; F02M 25/0742
USPC ........ 60/605.1, 274, 273, 282, 300, 289, 304, 60/600, 285; 422/179
See application file for complete search history.

(56) References Cited

U.S. PATENT DOCUMENTS

| 5,136,842 | A | 8/1992 | Achleitner et al. |
| 6,276,139 | B1 * | 8/2001 | Moraal et al. ................ 60/605.2 |
| 6,884,398 | B1 * | 4/2005 | Biel et al. ...................... 422/179 |
| 6,983,597 | B2 | 1/2006 | Wild et al. |
| 7,231,760 | B2 | 6/2007 | Busch |
| 7,293,545 | B2 * | 11/2007 | Dietl et al. .................... 123/299 |
| 7,814,752 | B2 | 10/2010 | Hu |
| 8,079,349 | B2 | 12/2011 | Rauner et al. |
| 8,734,743 | B2 * | 5/2014 | Muller-Stach et al. ..... 423/213.5 |
| 2005/0000217 | A1 | 1/2005 | Nau et al. |
| 2005/0076637 | A1 * | 4/2005 | Odendall et al. ................ 60/285 |
| 2006/0283187 | A1 | 12/2006 | Broadbent |

(Continued)

FOREIGN PATENT DOCUMENTS

DE    10062377 A1    6/2002

OTHER PUBLICATIONS

BlackThorn web page "Exhaust Technologies" under "Exothermic" at http://www.blackthorn.net/exothermic-reactions-in-catalytic-converters, retrieved May 12, 2015.*

(Continued)

*Primary Examiner* — Jesse Bogue
*Assistant Examiner* — Thomas Olszewski
(74) *Attorney, Agent, or Firm* — Julia Voutyras; Alleman Hall McCoy Russell & Tuttle LLP

(57) ABSTRACT

Embodiments for heating an emission control device are provided. In one example, a method for a turbocharged engine comprises during an engine cold-start, delivering boosted air from downstream of a compressor into a wastegate duct coupled across a turbine and exothermically reacting a reductant with the boosted air upstream of an exhaust emission control device. In this way, boosted air may be used to initiate an exothermic reaction to heat the device.

15 Claims, 3 Drawing Sheets

(56) References Cited

U.S. PATENT DOCUMENTS

2007/0283698 A1* 12/2007 Chen .......................... 60/605.1
2009/0133386 A1   5/2009 Porten et al.
2011/0107739 A1* 5/2011 Shimizu et al. ................. 60/273

OTHER PUBLICATIONS

Bjorge, Deborah M. et al., "Compressor Flow Control," U.S. Appl. No. 13/293,642, filed Nov. 10, 2011, 25 pages.

* cited by examiner

SECONDARY AIR INTRODUCTION SYSTEM

FIELD

The present disclosure relates to a secondary air introduction system for an internal combustion engine.

BACKGROUND AND SUMMARY

Exhaust emission control devices, such as catalytic converters, achieve higher emission reduction after reaching a predetermined operating temperature. Thus, to lower vehicle emissions, various methods are possible to raise emission control device temperature as fast as possible.

In one approach to raise the emission control device temperature, an engine is operated with a rich air-fuel ratio and secondary air is directly introduced into the exhaust upstream of an emission control device. Such a system is disclosed in U.S. Pat. No. 5,136,842. In this system, the excess fuel from the engine is expelled into the exhaust, where it reacts with the secondary air upstream of the emission control device. The reacted fuel increases the temperature of the exhaust, thus heating the emission control device. However, in order to introduce the secondary air into the exhaust, a secondary air pump is used to increase the pressure of the secondary above the exhaust pressure. Use of such a pump may degrade fuel efficiency and requires additional packaging space, thus reducing the efficiency of the engine.

The inventors herein have recognized the issues with the above approach and offer a method to at least partly address them. In one embodiment, a method for a turbocharged engine comprises during an engine cold-start, delivering boosted air from downstream of a compressor into a wastegate duct coupled across a turbine and exothermically reacting a reductant with the boosted air upstream of an exhaust emission control device.

In this way, boosted air downstream of the compressor may be directed to the exhaust upstream of an emission control device without utilizing a separate pump. By utilizing the pressure differential between the throttle inlet pressure downstream of the compressor and the turbine outlet pressure near where the secondary air is introduced into the wastegate valve, the boosted air may be driven to the exhaust without a separate pressurization mechanism. Further, in some examples the wastegate valve, which regulates the amount of exhaust bypassing the turbine via the wastegate duct, may be used to control the reaction rate between the exhaust and the introduced boosted air.

The present disclosure may offer several advantages. For example, by relying on boosted air rather than air pressurized by a pump, a separate air pump may be dispensed with, thus improving engine efficiency. Additionally, by introducing the boosted air to the wastegate duct, the reaction between the reductants in the exhaust and the boosted air may be controlled by the wastegate valve, thus ensuring that the turbine, emission control device, or other exhaust system components are not subject to high temperatures that may result in component degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
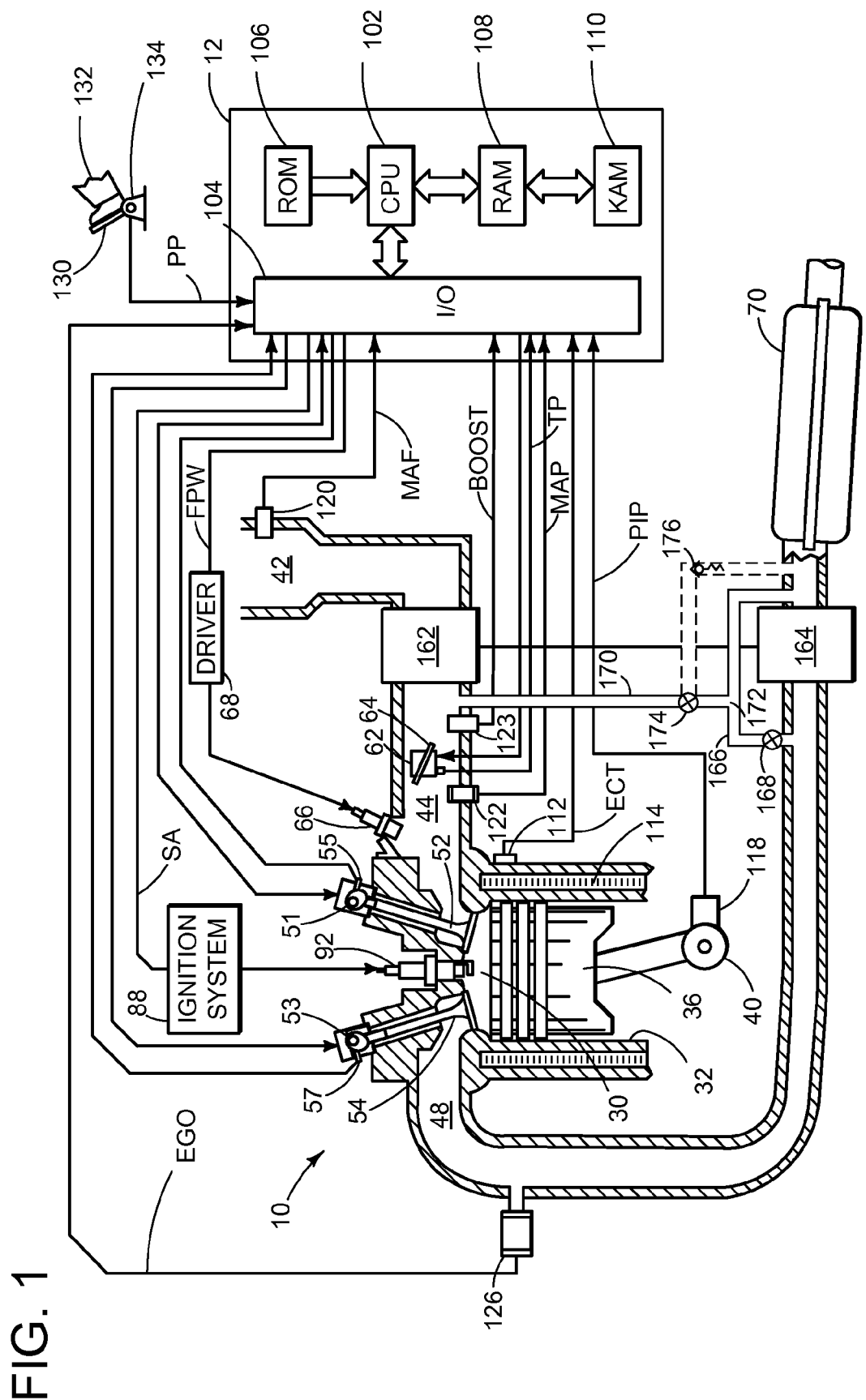
FIG. 1 shows a schematic diagram of an engine.

To rapidly heat an emission control device such as a catalytic converter, vehicles may include a secondary air introduction system, also referred to as a ported electric thermactor air (PETA) system, to introduce oxygen-rich secondary into the exhaust upstream of the emission control device. The excess oxygen in the secondary air will react with reductants, such as unburnt fuel, in the exhaust to create an exothermic reaction that will heat the emission control device. To efficiently introduce the secondary air to the exhaust, boosted air downstream of a compressor may be routed to the exhaust, either via a wastegate duct coupled across a turbine or via an exhaust passage. In some examples, control of the reaction may be provided by regulating a wastegate valve in the wastegate duct. FIG. 1 is an example engine including a secondary air introduction system and a controller configured to carry out the method of FIG. 2. Example engine operating parameters during an engine cold start, in which an emission control device is heated via secondary air, are illustrated in FIG. 3.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake passage 42. For a turbocharger, compressor 162 may be at least partially driven by a turbine 164 (e.g., via a shaft) arranged along exhaust passage 48. Air flow through turbine 164 may be regulated by a wastegate valve 168 positioned in a wastegate duct 166 coupled across the turbine. When the wastegate valve 168 is open, exhaust may bypass turbine 164 and instead travel through wastegate duct 166 before being admitted to the exhaust passage 48 downstream of the turbine 164. In this way, the turbine speed, and hence boost pressure, may be regulated. The position of wastegate valve 168 may be controlled by a signal sent from controller 12. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may include a secondary air introduction system to introduce secondary air to the exhaust system. A secondary air conduit 170 may couple intake passage 42 downstream of compressor 162 to the exhaust system. In a first embodiment, secondary air conduit 170 may be coupled at its downstream end to wastegate duct 166 downstream of wastegate valve 168. In this way, boosted air from downstream of compressor 162 may be directed to wastegate duct 166 via secondary air conduit 170. The outlet of secondary air conduit 170 may be coupled to an inlet of wastegate duct 166 at port 172. A secondary air valve 174, regulated by controller 12, in secondary air conduit 170 may regulate the amount of boosted air directed to wastegate duct 166. The amount of exhaust introduced into wastegate duct 166 may be controlled by wastegate valve 168. In doing so, unburnt hydrocarbons or other reductants in the exhaust may exothermically react with the oxygen in the introduced secondary air, releasing heat to raise the temperature of a downstream emission control device (e.g., emission control device 70). Additionally, by directing the boosted air to the wastegate duct, packaging space in the engine may be conserved. For example, by positioning the inlet of the secondary air conduit proximal to the downstream side of the compressor, the shortest path to the exhaust system results in the secondary air conduit outlet being proximal to the wastegate duct. Further, by controlling both the amount of boosted air and the amount exhaust directed to wastegate duct 166, via secondary air valve 174 and wastegate valve 168, respectively, the exothermic reaction may be regulated to maintain a desired temperature and/or rate of reaction.

In a second embodiment, depicted in FIG. 1 by the dashed lines, secondary air conduit 170 may be coupled at its downstream end to exhaust passage 48 downstream of turbine 164. In this embodiment, the amount of secondary or boosted air introduced into the exhaust may also be controlled via secondary air valve 174. Because the pressure of the exhaust at the turbine outlet is typically lower than the pressure of the intake air downstream of the compressor, the secondary air may be driven to the exhaust passage without an additional pressurization mechanism, whether the secondary air is delivered directly to the exhaust passage downstream of the turbine, or whether it is directed to the wastegate duct. However, under some conditions, such as immediately following an engine start, the exhaust pressure at the turbine outlet may be higher than the pressure downstream of the compressor. To prevent exhaust from traveling into the intake passage during these conditions, a check valve 176 may be present in the secondary air conduit 170.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
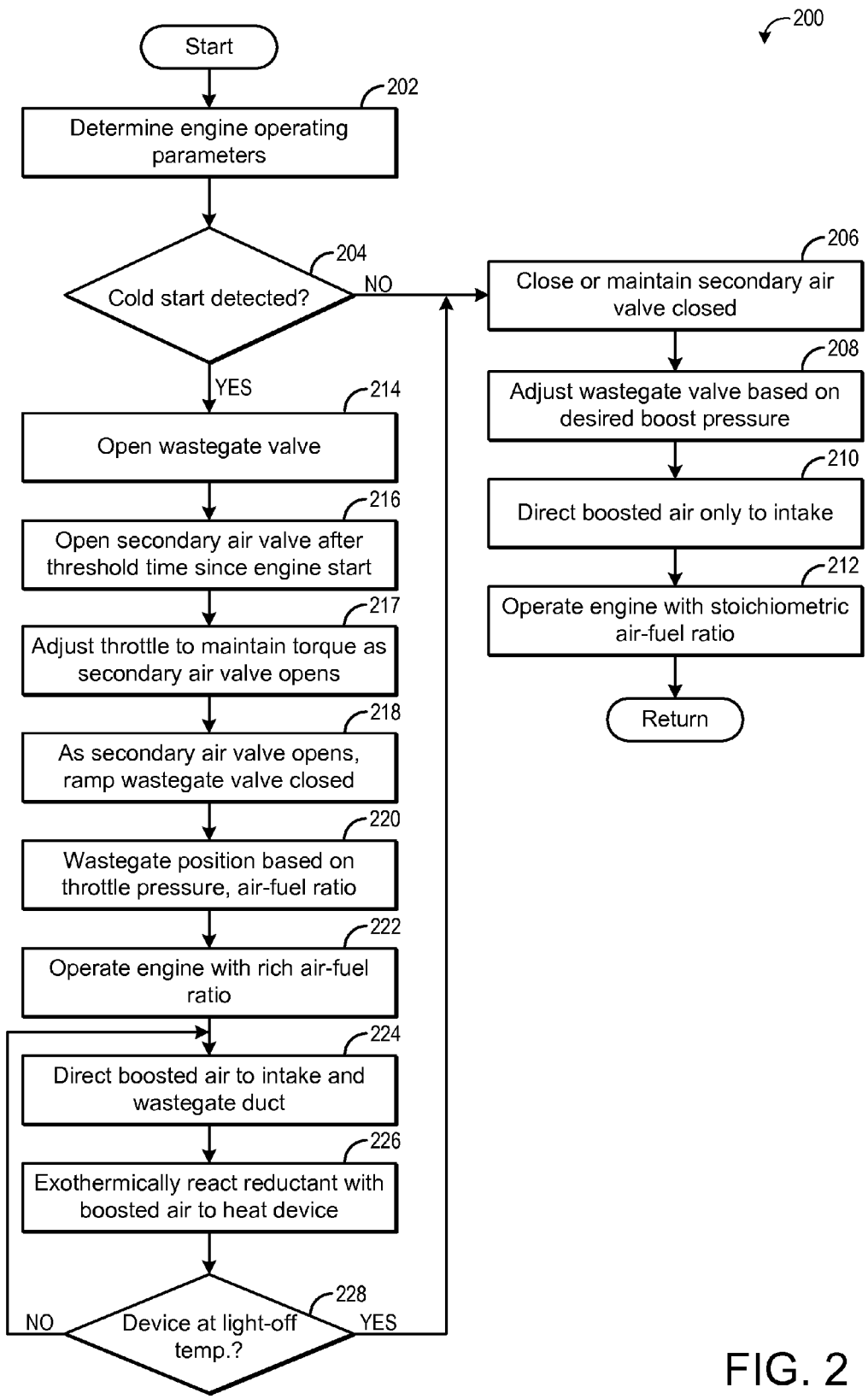
FIG. 2 shows a flow chart illustrating a method for heating an emission control device via introduction of boosted air.
Figure 3:
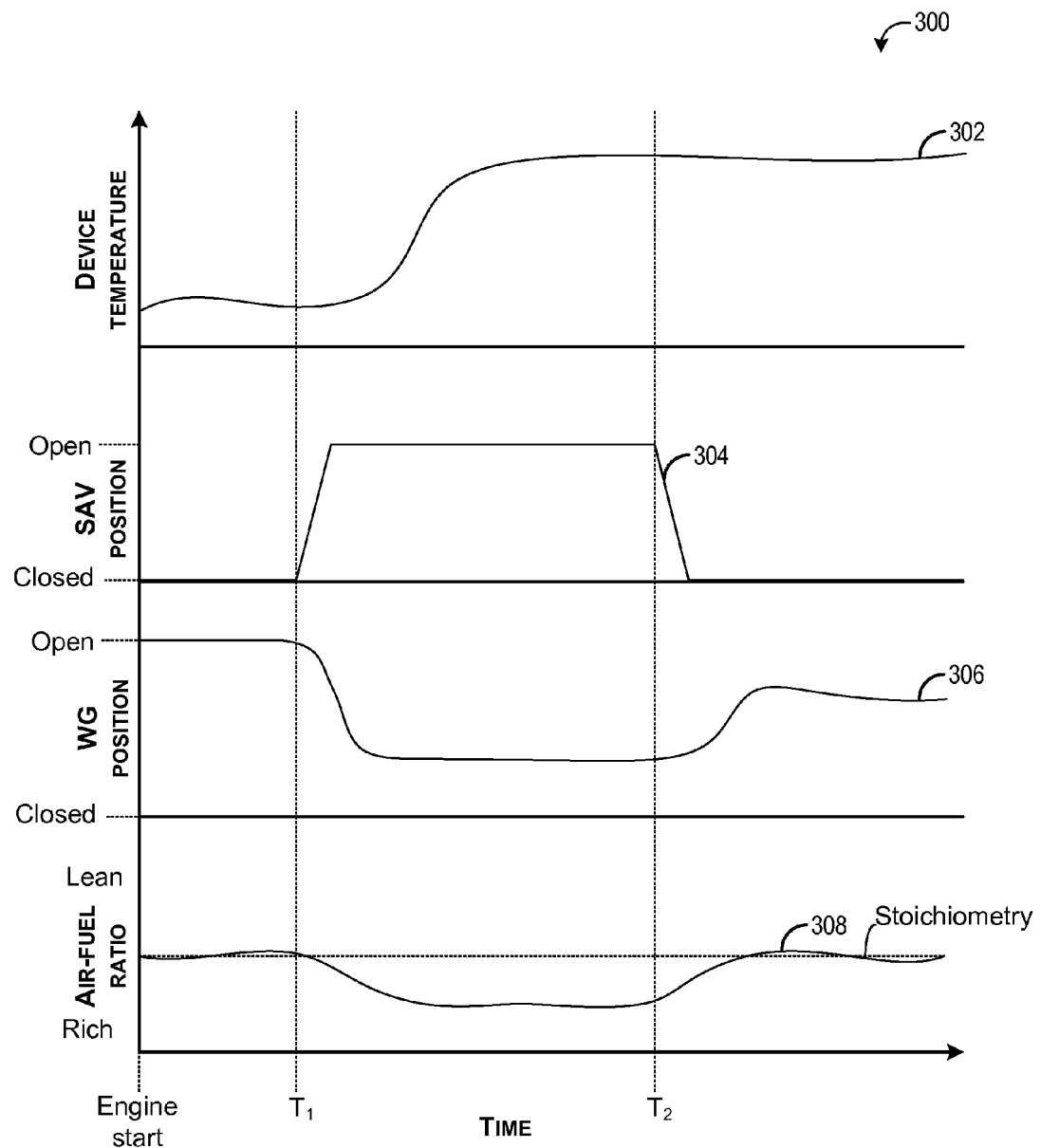
FIG. 3 is a diagram illustrating various engine operating parameters during the execution of the method of FIG. 2.

Turning to FIG. 2, a method 200 for heating an emission control device is presented. Method 200 may be carried out by controller 12 according to instructions stored thereon in order to heat emission control device 70 via an exothermic reaction started in wastegate duct 166. Method 200 comprises, at 202, determining engine operating parameters. The determined engine operating parameters may include engine speed, engine load, engine temperature, exhaust temperature, time since engine start, etc. At 204, it is determined, based on the engine operating parameters, if an engine cold start is detected. The engine cold start may be an engine start and period of operation following an engine start wherein the engine is relatively cool, such as at ambient temperature at engine start. During an engine cold start, the emission control device may be below operating temperature, such as below its light-off temperature, and thus emissions in the exhaust, such as unburnt hydrocarbons, NOx, and CO, may slip past the device to the atmosphere. The device may continue to operate below optimal efficiency until the engine reaches operating temperature, which depending on the ambient temperature, may take anywhere from a few seconds to a minute or longer. To rapidly heat the emission control device during an engine cold start, an exothermic reaction may be initiated by introducing oxygen-rich intake air to the exhaust upstream of the emission control device, where unburnt hydrocarbons and other reductants react with the oxygen to produce heat.

Thus, if it is determined at 204 that the engine is not operating under cold start conditions, method 200 proceeds to 206 to keep the secondary air valve closed, as heating of the emission control device is not indicated. At 208, the wastegate valve is adjusted to provide desired boost pressure, and at 210, the boosted intake air is directly only to the intake of the engine. At 212, the engine is operated with stoichiometric air-fuel ratio, or other desired air-fuel ratio based on engine operating parameters and detected exhaust oxygen content, and then method 200 ends.

However, if it is determined that the engine is operating under cold start conditions, method 200 proceeds to heat the emission control device by introducing boosted air to the exhaust. To introduce the boosted air and maintain a controlled exothermic reaction that does not result in high temperatures that may degrade exhaust system components, the wastegate valve may be coordinately adjusted with the secondary air valve, independent of desired boost pressure. This is in contrast to the non-cold start conditions described above, where the wastegate valve is adjusted based on desired boost pressure. Thus, at 214, the wastegate valve is opened or maintained in the open position immediately following the engine start. Opening the wastegate valve may divert exhaust around the turbine, thus preventing additional exhaust cooling that may result from traversing the turbine. However, an open wastegate may also cause a reduction in the amount of boost pressure, delaying the introduction of the boosted air to the exhaust. Thus, under some conditions, the wastegate valve may be opened following a cold start, while in other conditions, the wastegate may be closed following a cold start.

The secondary air valve may have a default position of the fully closed position, in order to avoid diverting intake air away from the intake manifold under conditions where heating of the emission control device is not indicated. Thus, immediately following an engine start, the secondary air valve is in the closed position. As the temperature of the exhaust immediately following the engine start may be too cold to initiate an exothermic reaction, the secondary air valve may be kept closed for a duration immediately following the cold start. Further, immediately following the engine start, sufficient boost pressure may not be available to drive the secondary boosted air the wastegate duct. However, as indicated at 216, the secondary air valve may be opened after a threshold amount of time since the engine start. The threshold amount of time may be a predefined time after which sufficient exhaust temperature and boost pressure have built. In other embodiments, the threshold amount of time may be based on operating conditions, such as the pressure differential between the throttle inlet pressure and the turbine outlet pressure. In this case, the threshold amount of time may be the time when throttle inlet pressure exceeds turbine outlet pressure.

At 217, the intake throttle is adjusted to maintain torque as the secondary air valve opens. When the secondary air valve is open, a portion of the boosted intake air is diverted to the wastegate duct. As a result, less boosted air than desired is provided to the engine for the requested torque. To maintain torque, the throttle may be opened. At 218, the wastegate valve is ramped closed as the secondary air valve is opened. However, if the wastegate was initially closed, at 218 the wastegate valve may be ramped open as the secondary valve is opened. The wastegate valve may set to a position that provides a desired amount of exhaust to the wastegate duct. Thus, as indicated at 220, the wastegate valve position may be based on various parameters of the desired exothermic reaction. For example, the position of the wastegate valve, and hence the amount of exhaust admitted to the wastegate duct, may be based on throttle inlet pressure and the position of the secondary air valve (e.g., how much secondary air is reaching the wastegate duct), the exhaust air-fuel ratio (e.g., how much reductant is available in the exhaust to be reacted), difference between current and desired emission control device temperature, etc.

At 222, the engine may be operated with rich air-fuel ratio. To provide extra reductants in the exhaust to react in the wastegate duct, extra fuel may be injected to the cylinders. At 224, the boosted air downstream of the compressor is directed to both the intake of the engine and as secondary air to the wastegate duct. The boosted air may be directed to the wastegate duct via the secondary air conduit. At 226, the reductant in the exhaust is exothermically reacted with the secondary air to heat the emission control device.

At 228, it is determined if the emission control device is at light-off or other predefined operating temperature. The temperature of the emission control device may be determined based on operating conditions, such as exhaust temperature and mass flow rate, or it may be determined based on feedback from a temperature sensor in the device. If the device has not yet reached operating temperature, method 200 loops back to 224 to continue to direct boosted air to the wastegate duct to maintain the exothermic reaction. If the device has reached operating temperature, method 200 proceeds to 206 to close the secondary air valve, and as explained earlier, adjust the wastegate valve based on desired boost pressure, and operate the engine with stoichiometric air-fuel ratio or other desired air-fuel ratio, and method 200 then returns.

While method 200 presented above delivers secondary air to a wastegate duct during engine cold-start conditions, other variations are possible. For example, as explained above with respect to FIG. 1, the secondary air conduit may deliver boosted air to the exhaust passage downstream of the turbine instead of the wastegate duct. In this configuration, control of the wastegate valve (if one is present) may continue to be based on desired boost pressure rather than to control the exothermic reaction. The secondary air valve opening is still delayed until after throttle inlet pressure exceeds turbine outlet pressure. In another example, secondary air may be delivered to the wastegate duct (or exhaust passage) during a regeneration event of a downstream emission control device. Emission control devices, such as particulate filters, may be regenerated when the load of exhaust emissions (e.g., soot) in the device reaches capacity. The regeneration may include raising the temperature of the device to burn off the built up matter. Upon initiation of the regeneration event, the secondary air valve may be opened, and the wastegate valve may be controlled to provide a desired amount of exhaust to the wastegate duct to start a reaction between the exhaust and the secondary air to heat the emission control device. Further, during the regeneration, the engine air-fuel ratio may be commanded rich.

FIG. 3 is a diagram 300 showing example operating parameters during an engine cold start. The operating parameters depicted in diagram 300 include emission control device temperature (illustrated by curve 302), secondary air valve (SAV) position (illustrated by curve 304), wastegate valve (WG) position (illustrated by curve 306), and air-fuel ratio (illustrated by curve 308). For each operating parameter depicted, time is illustrated on the horizontal axis, and the values of each respective operating parameter are depicted on the vertical axis. The time duration depicted in diagram 300 begins at the engine start and ends at a time after the engine and emission control device have reached operating temperature.

The emission control device illustrated by curve 302 starts with a relatively low temperature, as the engine and exhaust components are at ambient temperature upon start-up of the engine. Following time $T_1$, the device temperature starts to increase, due in part to the heating of the exhaust gas as the engine warms up and in part to the exothermic reaction occurring the wastegate duct, as explained below. After time $T_2$, the device has reached its operating temperature.

The position of the secondary air valve, depicted by curve 304, is in its default, closed position prior to time $T_1$. However, at time $T_1$, the secondary air valve opens, and remains open until the device reaches operating temperature at time $T_2$. The secondary air valve may open after a threshold amount of time passes since the engine start, such as three seconds, or it may open once throttle inlet pressure exceeds turbine outlet pressure or once the exhaust temperature reaches a threshold temperature.

The wastegate valve position, depicted by curve 306, may be in the fully open position immediately following the engine start, to reduce extra exhaust cooling resulting from passage of the exhaust through the turbine. At time $T_1$, when the secondary air valve opens, the wastegate valve ramps closed. However, the wastegate valve remains partially open between time $T_1$ and $T_2$, to admit some exhaust gas to the wastegate duct to react with the secondary air. After time $T_2$, the wastegate valve is controlled to provide desired boost pressure of the intake air in the intake system.

To produce extra reductants in the exhaust, the engine air-fuel ratio, depicted by curve 308, may be commanded rich after time $T_1$. Prior to time $T_1$ and after time $T_2$, air-fuel ratio may be maintained near stoichiometry. However, before time $T_1$ and after $T_2$, air-fuel ratio may be commanded to a suitable ratio for the given operating conditions.

Thus, the system and method presented herein provide for heating an emission control device by introducing boosted intake air to the exhaust system upstream of the emission control device. The boosted air reacts with one or more reductants in the exhaust (such as unburnt hydrocarbons) to produce heat. The boosted air may be introduced to the exhaust system during an engine cold start, where the engine is operating at ambient temperature at start-up. The boosted air may be introduced when a temperature of the emission control device is below a threshold, such as light-off temperature or a threshold regeneration temperature. The boosted air may be directed to a wastegate duct of a turbine, thus allowing for the reaction between the exhaust and the boosted air to be controlled by coordinate adjustment of a wastegate valve and secondary air valve. In other examples, the boosted air may be directed to the exhaust passage downstream of the turbine. By introducing boosted air at the wastegate duct or exhaust passage downstream of the turbine, the pressure difference between the inlet of the secondary air conduit (e.g., downstream of the compressor) and the outlet of the secondary air conduit (e.g., downstream of the turbine) may drive the introduction of the air rather than a separate air pump. In this way, engine packaging space may be reduced and fuel economy may be improved.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine, comprising:
    during an engine cold-start,
        coordinating adjustment of an air valve positioned in a duct connecting a compressor outlet with a wastegate duct coupled across a turbine with adjustment of a wastegate valve positioned in the wastegate duct, independent of a desired boost pressure, to deliver boosted air from downstream of the compressor outlet into the wastegate duct, where the air valve is positioned in the duct upstream of the connection of the duct with the wastegate duct; and exothermically reacting a reductant generated from rich cylinder combustion with the boosted air upstream of an exhaust emission control device; and during non-engine cold-start conditions, adjusting the wastegate valve based on desired boost pressure and maintaining the air valve in a closed position.

2. The method of claim 1, further comprising directing heat produced from the exothermic reaction to the exhaust emission control device to heat the device, and wherein the engine cold-start comprises engine temperature at ambient temperature during an engine start.

3. The method of claim 1, further comprising immediately following an engine start event, opening the wastegate valve with the air valve closed.

4. The method of claim 3, wherein coordinating adjustment of the air valve and the wastegate valve further comprises, once throttle inlet pressure exceeds turbine outlet pressure, ramping the wastegate valve closed while opening the air valve.

5. The method of claim 4, wherein the wastegate valve is closed by an amount based on throttle inlet pressure and exhaust air-fuel ratio.

6. A method for an engine comprising:
during a first mode, opening an air valve to deliver boosted air into a wastegate duct coupled across a turbine, and adjusting a wastegate valve positioned in the wastegate duct to deliver a desired amount of exhaust gas to the wastegate duct; and
during a second mode, closing the air valve, and adjusting the wastegate valve based on desired boost pressure, the air valve positioned in a duct connecting a compressor outlet to the wastegate duct, the air valve positioned in the duct upstream of the connection of the duct with the wastegate duct.

7. The method of claim 6, wherein the first mode comprises an emission control device downstream of the turbine being below a threshold temperature, and wherein the second mode comprises the emission control device being above the threshold temperature.

8. The method of claim 6, wherein the first mode comprises an emission control device downstream of the turbine undergoing a regeneration event, and wherein the second mode comprises the emission control device being in a non-regenerative state.

9. The method of claim 7, wherein the desired amount of exhaust gas is based on exhaust air-fuel ratio.

10. The method of claim 7, wherein the desired amount of exhaust gas is based on throttle inlet pressure.

11. The method of claim 6, further comprising, during the first mode, operating the engine with rich combustion air-fuel ratio, and during the second mode, operating the engine at substantially stoichiometric air-fuel ratio.

12. A system, comprising:
an engine;
a turbocharger including a compressor upstream of the engine and a turbine downstream of the engine;
a wastegate duct coupled across the turbine and including a wastegate valve arranged therein;
a secondary air conduit coupling an intake passage downstream of the compressor to the wastegate duct and including an air valve arranged therein, the air valve positioned in the secondary air conduit upstream of a connection of the secondary air conduit with the wastegate duct; and
a controller including instructions to coordinate adjustment of the air valve with adjustment of the wastegate valve, independent of a desired boost pressure, during engine cold start conditions, and instructions to adjust the wastegate valve based on the desired boost pressure and maintain the air valve in a closed position during non-engine cold-start conditions.

13. The system of claim 12, wherein the controller includes further instructions to open the air valve during the engine cold start conditions to deliver boosted air to the wastegate duct.

14. The system of claim 12, wherein the controller includes further instructions to adjust the wastegate valve by an amount based on throttle inlet pressure and exhaust air-fuel ratio during the engine cold start conditions.

15. The system of claim 13, wherein during the engine cold start conditions, the delivered boosted air exothermically reacts with a reductant in exhaust gas upstream of an exhaust emission control device to heat the emission control device.

* * * * *